US006887805B2

(12) United States Patent
Chenel

(10) Patent No.: US 6,887,805 B2
(45) Date of Patent: May 3, 2005

(54) SCREEN FORMED FROM A STRETCHED FLEXIBLE SURFACE BEARING A PRINT

(76) Inventor: Guy Gilbert Chenel, 1 rue Marcel Loyau, 92100 Boulogne (FR)

( * ) Notice: Subject to any disclaimer, the term of this patent is extended or adjusted under 35 U.S.C. 154(b) by 172 days.

(21) Appl. No.: 10/118,813

(22) Filed: Apr. 9, 2002

(65) Prior Publication Data

US 2002/0151244 A1 Oct. 17, 2002

(30) Foreign Application Priority Data

Apr. 10, 2001 (FR) .......................................... 01 04859

(51) Int. Cl.[7] .............................. B32B 5/26; B32B 3/00

(52) U.S. Cl. ........................... 442/35; 442/59; 442/361; 442/364; 428/195; 428/373

(58) Field of Search .......................... 442/35, 361, 364, 442/419, 59; 428/195, 373

(56) References Cited

U.S. PATENT DOCUMENTS

| | | | | |
|---|---|---|---|---|
| 4,921,645 A | | 5/1990 | Insley | 264/6 |
| 5,759,673 A | * | 6/1998 | Ikezawa et al. | 428/32.25 |
| 5,876,551 A | | 3/1999 | Jackson | 156/307.4 |
| 6,103,364 A | * | 8/2000 | Harris et al. | 428/326 |
| 6,209,244 B1 | | 4/2001 | Chenel | 40/584 |

FOREIGN PATENT DOCUMENTS

| | | |
|---|---|---|
| EP | 0 704 315 A1 | 4/1996 |
| EP | 0 842 792 A1 | 5/1998 |

* cited by examiner

*Primary Examiner*—Ula Ruddock
(74) *Attorney, Agent, or Firm*—Drinker Biddle & Reath LLP

(57) ABSTRACT

A screen formed from a stretched flexible surface, particularly for an external installation, comprises a non-woven fabric provided with a print. One face of the non-woven fabric is provided with a thin permeable layer formed by flakes which receive the print.

11 Claims, 3 Drawing Sheets

1
2
C
D
E
P
3
4
10
11
12
13
14
110
130
131
e

SCREEN FORMED FROM A STRETCHED FLEXIBLE SURFACE BEARING A PRINT

FIELD OF THE INVENTION

The present invention relates to a screen formed from a stretched flexible surface, particularly for an external installation, comprising a non-woven fabric provided with a print.

BACKGROUND OF THE INVENTION

A screen of the type defined above is already known and is formed by a fabric of non-woven material of which one face is provided with a print by ink jets, marking the fibers without forming a film between the fibers.

Such a screen is distinguished from screens formed by canvas sheets, that is to say textile surfaces generally consisting of a polyester fabric provided with an impervious coating of polyvinyl chloride (PVC) so that it has a surface which is impermeable to air.

In fact, according to certain regulations currently in force, surfaces such as canvas sheets or screens which are installed externally, in front of buildings or in isolation, must permit a certain passage of wind in order to reduce the forces exerted by the wind on these surfaces and the structures which support them.

For this, the canvas sheets must have passages, generally in the form of U-shaped cut-outs, which form flaps which are free to open in order to make the openings available for the passage of air. According to certain regulations, the surface thus freed in the total surface of the canvas sheet is less than 10% of the total surface of the canvas sheet.

There are already in existence screens with a decorative surface which are formed by a non-woven fabric on which the decoration has been printed by monochrome or polychrome printing by ink jets.

However, although these known screens which are formed from a non-woven fabric are of more interest than canvas sheets because they necessitate less resistant support structures for stability in the wind, they do nevertheless have a certain number of drawbacks. First of all, since the material itself is relatively porous it functions as a filter and dirt accumulates in the thickness of the non-woven fabric.

For example, it is known (according to EP 0 704 315) to produce a printing substrate made from a fibrous product coated with porous particles having dimensions varying from 0.1 to 30 $\mu$m, and a surface layer made from boehmite. However, such a layer to receive the ink is not air-permeable or at least it is not sufficiently so in order to form an external screen.

Furthermore, ink jet printing, which penetrates more or less and spreads through a relatively substantial thickness of the non-woven fabric, does not give an image which is as precise and clear as one might wish since certain of the printing droplets penetrate too deeply into the non-woven fabric to be perceptible on the exterior. This can spoil the sharpness of an outline or the colour which is produced by ink jets and results from the combination of primary shades.

Finally, since the ink jets are projected according to a certain firing line, if the image is not viewed from the same angle the image seen will not have the desired sharpness due to this "in depth" printing.

Finally, when these screens have substantial surface areas they lack resistance and can deform or collapse.

OBJECT OF THE INVENTION

The present invention seeks to remedy these drawbacks and proposes the development of a decorative screen intended to be installed primarily externally, in which the quality of the graphic reproduction of the image is excellent, which resists dirt and offers a sufficient mechanical stability when the screen is produced with a large surface area.

SUMMARY OF THE INVENTION

To this end the invention relates to a screen of the above-mentioned type, characterised in that it is formed from a non-woven fabric of which one face at least is provided with a thin layer of fibers of which the visible surface is increased at least locally in order to produce a permeable layer to receive the printing.

The visible surface of the fiber according to the present description is the surface of the section of the fiber in a plane substantially parallel to the face of the fabric or also the geometric projection of the contour of the fiber on a plane parallel to the face of the fabric. This increase, at least locally, in the visible surface of certain fibers is produced either by a local deformation of the fiber or by a local addition of material.

According to a first embodiment the increase, at least locally, in the visible surface of at least certain parts of fibers is produced by a surface coating or a sprinkling of primer forming the flakes, and this non-woven fabric can then be calendered in order to form a thin surface layer of which the visible section at least of certain fibers is increased by the flakes which may be combined on crushing, and welds between the fibers. Thus a permeable layer is formed which receives the print.

This permeable layer of flakes can be produced by a thin, pasty, light and discontinuous application scraped over the surface, or by a sprinkling of a product which is sufficiently thick to be deposited by forming flakes on the surface fibers of the non-woven fabric, which only slightly reduces the permeability of the filtering surface. These two surface treatments (called primers) can be constituted by polyurethanes, melamine-formol or acrylic compounds which are then generally polymerised under heat.

The screen according to the invention offers the advantage of having sufficient permeability (of the order of 10% to 20%) to permit a sufficient passage of air so that the resultant of the forces exerted on the screen and consequently on the structure supporting the screen is not excessive.

Since a reduced air flow passes through the screen, dirt does not accumulate there to such an extent as in a screen of non-woven fabric without flakes on the surface. Moreover, the flakes constitute a visible layer which hides the interior of the non-woven fabric in such a way that even the dirt particles which have penetrated into the non-woven fabric do not appear on the surface.

The size of the flakes makes it possible to create a good matt surface for inscription or for decoration, giving a precise and clear decoration and retaining all the original quality of the image regardless of the angle at which the screen is viewed. The qualities of the screen are equally ensured by the flatness of the surface formed by the porous superficial coating such that, in contrast to the prior art, the ink jet printing is not made on free fibers directed in three dimensions in the surface layer of the non-woven fabric.

On the contrary, the fibers covered with flakes remain in a relatively flat surface which forms the permeable surface for decoration.

According to another advantageous characteristic, the permeable surface layer is a coating or a sprinkling which can advantageously be calendered and/or polymerised under heat.

The coating is deposited in the form of a paste penetrating slightly into the non-woven fabric in order to attach itself to the fibers and form a thin discontinuous structure of flakes. Sprinkling, by surrounding the surface fibers with primer and enlarging them, has substantially the same appearance and the same result.

According to another embodiment the visible section of the fibers of the surface layer or thin layer is increased by producing the fabric from non-woven fibers, at least in part from welded dual-component fibers, ensuring both reinforcement and opacity, that is to say the increase in the visible surface sufficient for printing. The dual-component fibers have a core and a cladding, this latter having a softening point lower than that of the core.

The fabric is heated to the right temperature in order to obtain welds at the junction of the threads producing a structure which is solid in three dimensions. This non-woven fabric can also be calendered under heat in order to form a thin surface layer of which the visible section at least of certain fibers is increased by crushing combined with welds between the fibers, which will have the effect of tightening the fibers and widening the coatings of the cores of the fibers. This operation preserves the necessary permeability of the whole of the screen.

In the case of screens which have large dimensions or are intended to remain for a long time outside or in a strong wind, it is worthwhile to integrate a flexible reinforcing textile element into the non-woven fabric. This element can also be fixed on the rear face of the non-woven fabric.

According to another characteristic of the invention, the flexible reinforcing element can consist of a flexible and resistant grid, an open and resistant wide-mesh fabric, a resistant locked-mesh textile or lines of stitching.

According to another characteristic of the invention, the flexible reinforcing element is produced in the structure of the non-woven fabric itself, utilising the different resistances of the fibers of plastics materials as well as their different degrees of melting. It is equally possible to use dual-component fibers of plastics material of which the internal part or core has a melting point clearly higher than that of their peripheral cladding. Such dual-component fibers, chosen judiciously and disposed randomly to form a non-woven fabric, can be welded to one another at their points of contact after the whole assembly has been brought to the softening temperature of the cladding. The fibers whose cores are not altered by this temperature are welded after cooling by the solidified material of the claddings and then constitute a sort of resistant mesh or framework in the three dimensions of the non-woven fabric. A non-woven fabric can be produced solely with dual-component fibers. They can also be mixed with other fibers of which the composition does not permit welding with the material of the claddings of the dual-component fibers. By the proportioning and the choice of these different fibers and of the length and the diameters thereof, a non-woven fabric is produced which is sufficiently resistant, opaque and permeable to air. According to the invention, the permeability of the assembly formed by the non-woven fabric and its permeable surface layer provided with the print provides an overall permeability to air of the order of 10 to 20%.

Although the screen according to the invention is generally visible simply by reflection of light on its front surface, it is equally possible to produce translucent screens which are lit from behind, particularly in order to form luminous screens. In this case it is worthwhile producing the screen from a non-woven fabric which has been given a permeable coating on its two faces and possible a flexible and resistant element in its median plane. The two faces of this screen can be provided with a flat symmetrical print on both faces, simultaneously in a double-sided ink jet printing machine.

BRIEF DESCRIPTION OF THE DRAWINGS

The present invention will be described below with the aid of an embodiment illustrated in the accompanying drawings, in which.

DESCRIPTION OF EMBODIMENTS

Figures 1, 2, 3, 4, 5, 6:
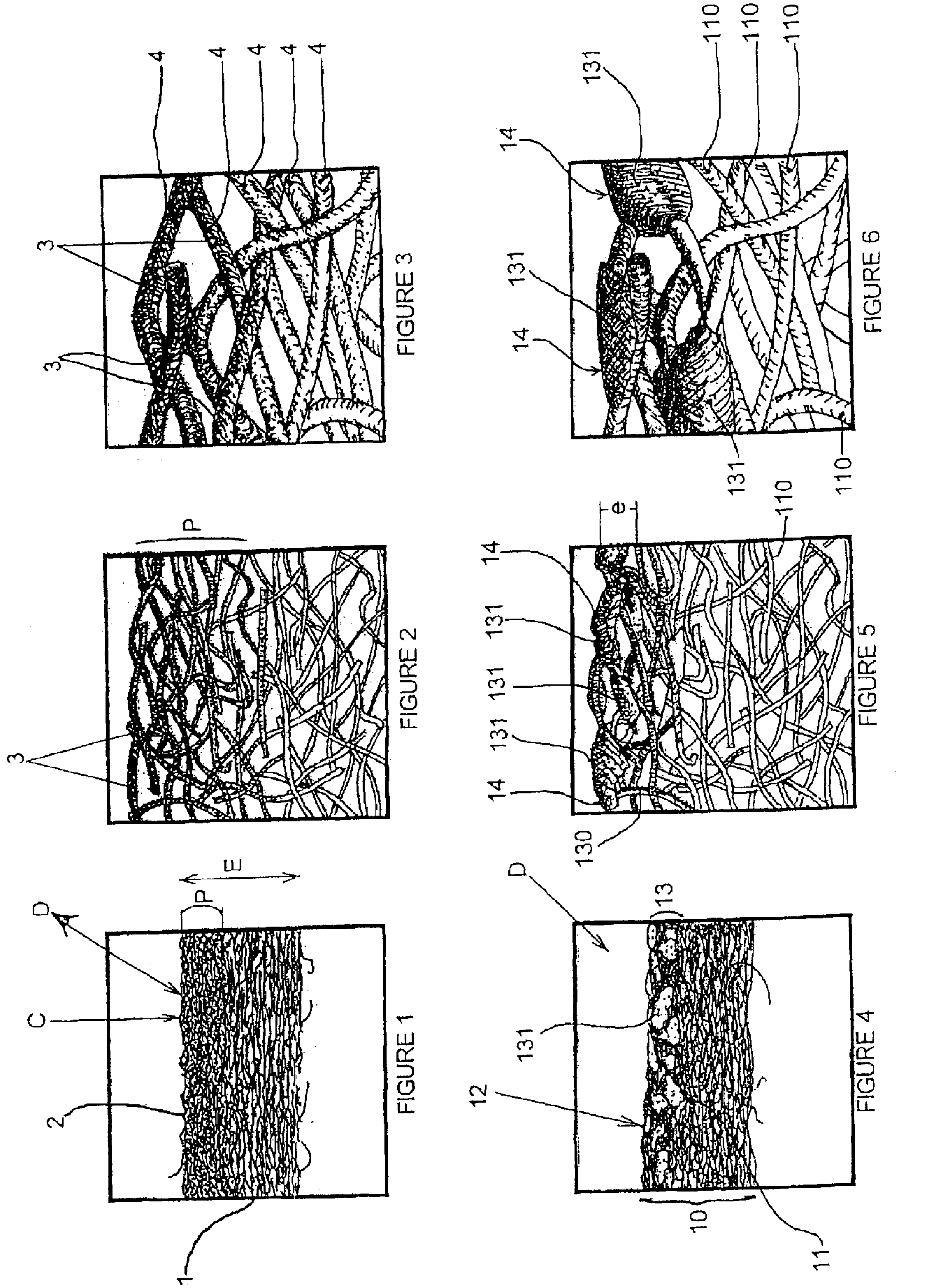
FIGS. 1 to 3 are schematic cross-sectional views of a known screen at three different magnifications.
FIGS. 4 to 6 are cross-sections of a screen according to the first embodiment of the invention at three different magnifications.

According to FIGS. 1 to 3, a known screen shown schematically in cross-section on three different scales of magnification (×20, ×80, ×350) is formed by a non-woven fabric 1 in which a decoration has been printed, from the face 2, by projection of ink jets. This projection is shown by the droplets 3 attached to the fibers 4 without however forming a film between the fibers due to the fluidity of the ink.

It will be noted that the print formed by the droplets 3 on the fibers 4 extends to a certain depth P which is substantial relative to the overall thickness E of the non woven fabric 1.

The direction of printing is shown by the arrow C. This direction of the ink jet or jets is generally perpendicular to the surface of the non-woven fabric. It can also be done at a different angle. However, due to this orientation of the ink jets and the penetration of the droplets, when it is viewed in a direction D different from the direction of printing C certain printing droplets are no longer apparent because they are hidden by fibers. Moreover, as a result of their deviation within the layer of fibers, certain droplets of ink become invisible from the exterior regardless of the direction D from which the visible face of the fabric is viewed.

The sharpness of the image is likewise spoiled when it is viewed in a direction different from the direction of printing. This is all the more marked as the "front" surface of the fabric (as also its "rear" surface) is not smooth but leaves fibers randomly distributed in all directions relative to the theoretical surface represented by the plane of the fabric.

FIGS. 4 to 6 show schematically three cross-sections on three different scales of magnification (×20, ×80, ×350) of a screen according to the first surface treatment process according to the invention.

The screen 10 is formed by a non-woven fabric 11 of which the front face 12 is provided over a small thickness with a permeable layer 13 intended to receive the print. The permeable surface layer 13 is formed by a pasty surface coating or a sprinkling of liquid primer which penetrates into the fibers 110 at the surface of the non-woven fabric 11.

The permeable surface layer 13 consists of flakes 131 attached to some fibers 110, as the enlargements of FIGS. 5 and 6 show, leaving gaps between the flakes. These flakes 131 are distributed practically at the surface. They also ensure a certain flatness on the surface by fixing the non-woven fibers which are sometimes flattened at the surface after calendering.

In the case of coating or sprinkling, gaps remain between the flakes ensuring the permeability of the layer.

The permeability of the screen formed by the non-woven fabric and the permeable surface layer of flakes is of the order of 10 to 20% in the sense of the permeability to air of a screen according to the definition given above.

After production of the support, the decoration is printed by ink jets. The droplets of ink 14 attach themselves to the flakes 131 of the surface layer 13 either at the surface or they penetrate slightly into the gaps. However, the thickness (e) of this layer 13 is very small and therefore the droplets 14 cannot penetrate deeply and above all there is no risk of them following random routes. In these conditions the sharpness of the image is the same regardless of the direction (D) in which the surface 12 of the surface layer 13 is viewed. Even if the droplets of ink penetrate to a certain depth of the surface layer 13, the droplets which must combine in order to form composite colours will give precisely the desired colours.

Figure 7:
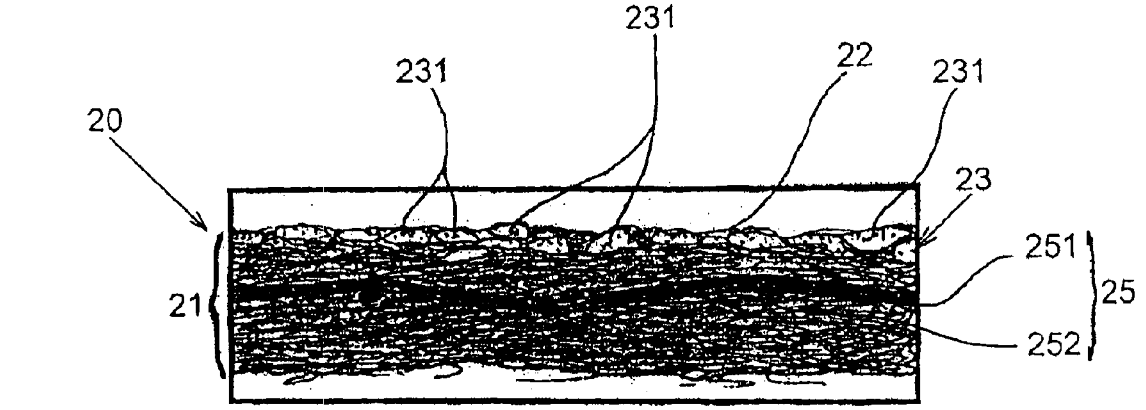
FIG. 7 shows another embodiment of a screen according to the invention with a resistant flexible support consisting of an integrated grid.

FIG. 7 shows schematically the cross-section of a screen 20 according to the invention at ×20 magnification, in which the non-woven part 21 is provided with a reinforcing grid 25; this grid is constituted by threads or strands 251 and 252 in two orthogonal directions. This flexible grid is integrated in the non-woven fabric 21. The other elements of this screen are the same as in the first embodiment. The front face 22 of the non-woven fabric 21 is provided with a permeable surface layer 23 formed by a coating or a sprinkling giving flakes 231; the assembly has a decoration formed of droplets of ink attached to the flakes 231.

Figure 8:
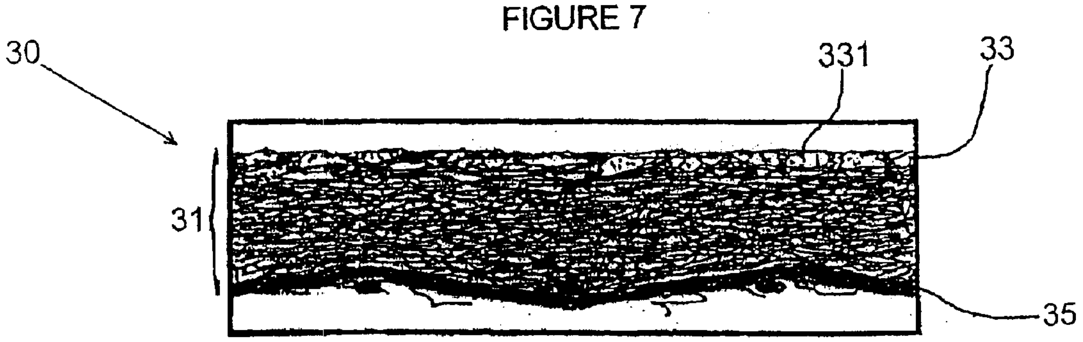
FIG. 8 shows another embodiment of a screen with a reinforcing grid on the rear surface.

FIG. 8 shows another embodiment of a screen 30 formed from a non-woven fabric 31 of which the front face is provided with a permeable surface coating 33 formed of flakes 331 which locally increase the visible surface of the fibers in order to produce, over a small thickness, the permeable layer which receives the droplets of ink of the decoration. This small thickness of the fabric (front face) can be calendered. The rear face of the fabric is provided with a reinforcing grid 35 which is formed of flexible threads and is applied and joined to the rear surface without being integrated in the mass.

Figure 9:
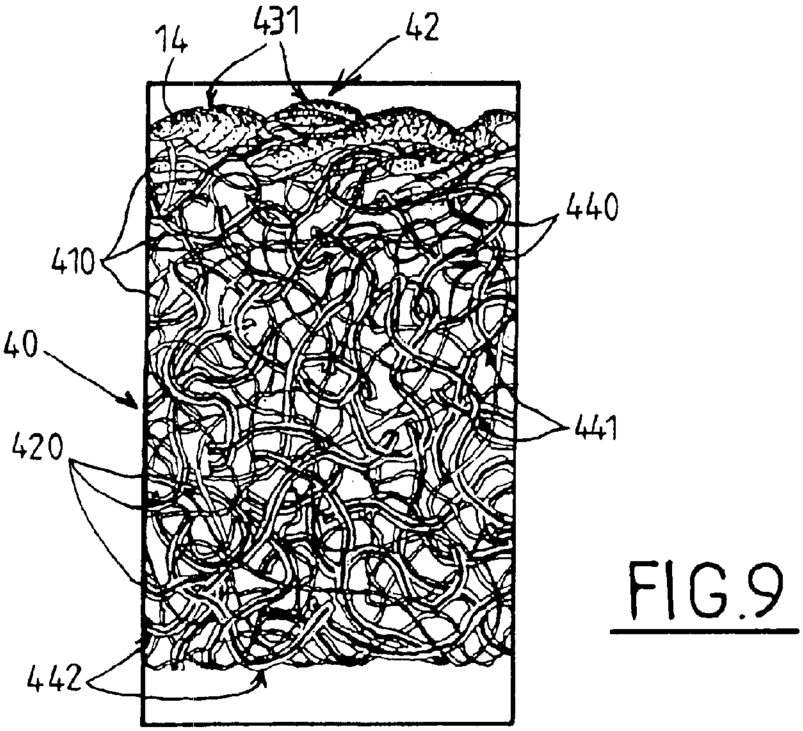
FIG. 9 shows another embodiment of a screen with an internal reinforcing structure consisting of a three-dimensional network of dual-component fibers with the first surface treatment process.

FIG. 9 shows schematically the cross-section of a screen 40 according to the invention at ×80 magnification, in which the non-woven fabric is constituted by single-component filling fibers 410 mixed to a structure which is resistant in three spatial dimensions with dual-component fibers 420. The resistant cores 440 of the fibers are welded at their points of contact 441 by the material 442 of their sheath of which the melting point is lower than that of the cores and of the filling fibers. The other elements of this screen are the same as in the other embodiments; the front face 42 of the non-woven fabric 40 is provided with a thin permeable layer formed by a coating or a sprinkling giving flakes 431; the decoration is produced by droplets of ink 14 projected onto the upper part of the flakes 431.

The same FIG. 9 can also illustrate an example of a screen in which the non-woven fabric 41 is constituted solely by dual-component fibers 420 formed of a core 440 and a sheath 442 made from different plastics materials at least as regards their melting point, that of the sheath being lower than that of the core.

In the thin surface layer the fibers are welded at their points of contact 441 by the material 442 constituting their sheath, the melting point of which is lower than that of the cores. The treatment of the surface of the fabric can be carried out under heat, by exposure to radiation, blowing hot air or by calendering.

This surface treatment produces not only the welding of certain of the fibers at the surface with the mechanical advantages already described but also produces a certain spreading of the fibers at certain locations, that is to say a local increase in their visible surface, producing the thin layer which receives the print without in practice reducing the permeability of the fabric.

Figure 10:
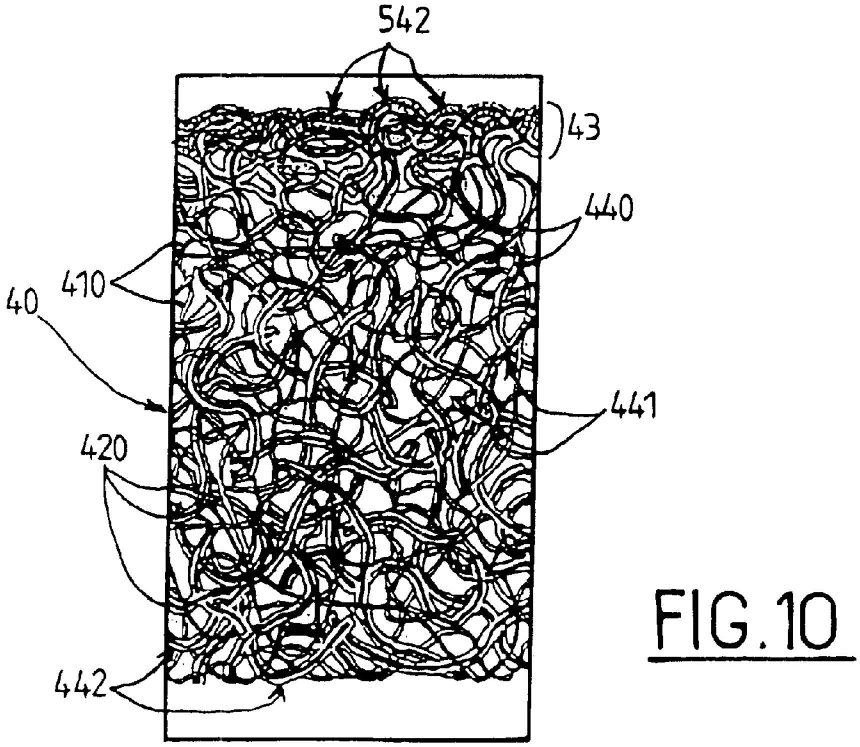
FIG. 10 shows the production of a screen with an internal reinforcing structure consisting of a three-dimensional network of dual-component fibers with the second surface treatment process.

FIG. 10 shows schematically the cross-section of a screen 40 according to the invention at ×80 magnification. As in FIG. 9, the non-woven fabric is constituted by single-component filling fibers 410 mixed to a structure which is resistant in three spatial dimensions with dualcomponent fibers 420. The resistant cores 440 of the fibers are welded at their points of contact 441 by the material 442 of their sheath of which the melting point is lower than that of the cores and of the filling fibers. This surface treatment is obtained by calendering under heat which increases the visible surface of at least certain fibers, that is to say the surfaces for receiving and fixing the prints by ink jets, by slightly crushing the claddings of the fibers softened by the effect of the heat. The fibers can also be at variable melting points in their thickness, that is to say they can have a low melting point on the exterior and a progressive or discontinuous increase of the melting temperature (melting point) towards the centre of the cross-section of the fiber.

These widened surfaces 542 create surfaces for receiving prints like the flakes 131 of FIGS. 4 to 6. The calendering brings the surface fibers closer together and thus ensures an increase in the surfaces for receiving the ink whilst always preserving an air permeability of 10 to 20%.

Finally, another embodiment of a screen intended to be seen against the light is a double-faced screen such as that shown in FIGS. 4, 7 or 9 but which would also have received a flexible and permeable coating of flakes on its rear face.

A double-faced screen such as that shown in FIG. 10 could also be produced, but also calendered under heat on its two faces so as to give only one single image as in the preceding case.

By the production of a decoration on the two faces on such a support, the decoration which is intended to have light shining through it can be produced in a symmetrical manner on its two faces so as to give only one single image when viewing the face with light shining through it from a light source directed against the other face.

Such a screen which is symmetrical with respect to the median plane of the support is extremely simple to produce by ink jet printing since it is sufficient very schematically to reverse one of the polarities of the printing signals. By virtue of the invention luminous images are obtained which are much more faithful.

The permeability of the screen, reduced to the level necessary to permit the wind to pass through under conditions defined by certain regulations offers the advantage that it is less than that of an untreated non-woven fabric and thus it retains less dirt. Also the screen according to the invention absorbs less moisture since for the most part the moisture has a tendency to run along the face provided with the smooth permeable layer. The sharpness of the images is improved considerably, eliminating any problem associated with parallax and the disappearance of the droplets of ink in the depths of the non-woven fabric, and the quality of the image is preserved regardless of the angle at which the surface of the fabric is viewed.

What is claimed is:

1. A screen formed from a stretched flexible surface bearing a print, comprising a non-woven fabric of which at least one face is provided with a thin layer of fibers, the visible surface of which fibers is at least locally increased in order to provide a permeable layer to receive said print.

2. The screen as claimed in claim 1, wherein the at least local visible surface increase of said fibers is produced by a surface coating or a sprinkling of primer forming flakes on said fibers.

3. The screen as claimed in claim 2, wherein the surface coating or sprinkling is calendered, polymerized under heat, or both calendered and polymerized under heat.

4. The screen as claimed in claim 2, wherein the surface coating is deposited in the form of a paste penetrating slightly into the non-woven fabric of the screen.

5. The screen as claimed in claim 1, wherein the thin layer of fibers in the non-woven fabric is formed at least in part by dual-component fibers having a core and a sheath, the melting point of the sheath being lower than that of the core, in order to increase the visible surface of at least certain parts of said dual-component fibers by at least partial melting thereof.

6. The screen as claimed in claim 5, wherein the partial sheath melting of said dual-component fibers is produced by hot air, radiation or calendering under heat, providing partial and local melting of the sheath and the welding of said fibers to one another at their points of contact.

7. The screen as claimed in claim 1, wherein the non-woven fabric includes a flexible reinforcing element integrated in the thickness of the non-woven fabric.

8. The screen as claimed in claim 7, wherein the flexible reinforcing element comprises a textile grid, a loosely woven fabric, a locked-mesh fabric, or lines of stitching.

9. The screen as claimed in claim 1, wherein the non-woven fabric includes a flexible reinforcing element joined to the rear face of the fabric.

10. The screen as claimed in claim 1, wherein the non-woven fabric including the permeable layer has an overall permeability of 10 to 20%.

11. The screen claimed in claim 1, which comprises a single layer of non-woven fabric having a coating on each of its two faces, and a flat symmetrical print on each face.

* * * * *